United States Patent [19]

Mizokami

[11] 4,426,143
[45] Jan. 17, 1984

[54] OVEREXPOSURE INDICATOR FOR AN AUTOMATIC ELECTRONIC FLASH

[75] Inventor: Kazunori Mizokami, Hachioji, Japan

[73] Assignee: Olympus Optical Company, Ltd., Tokyo, Japan

[21] Appl. No.: 406,204

[22] Filed: Aug. 9, 1982

[30] Foreign Application Priority Data

Oct. 21, 1981 [JP] Japan .................................. 56-168233

[51] Int. Cl.³ .............................................. G03B 15/05
[52] U.S. Cl. .................................... 354/416; 354/471; 354/127.1
[58] Field of Search ............... 354/33, 53, 60 E, 60 L, 354/127, 128, 145; 315/134, 136, 131, 241 P

[56] References Cited

U.S. PATENT DOCUMENTS 4,122,465 10/1978 Hasegawa et al. ............. 354/128 X
4,193,677 3/1980 Hasegawa et al. .................. 354/127

Primary Examiner—William B. Perkey
Attorney, Agent, or Firm—Weinstein & Sutton

[57] ABSTRACT

An overexposure indicator for an automatic electronic flash produces a time factor signal of a given duration after an emission terminate signal is delivered to an electronic flash. When the amount of flashlight emitted by the electronic flash reaches an arbitrary multiple of a proper value of exposure, a detection output is produced. The indicator indicates the occurrence of an overexposure whenever detection output is produced during the time the time factor signal is present.

9 Claims, 3 Drawing Figures

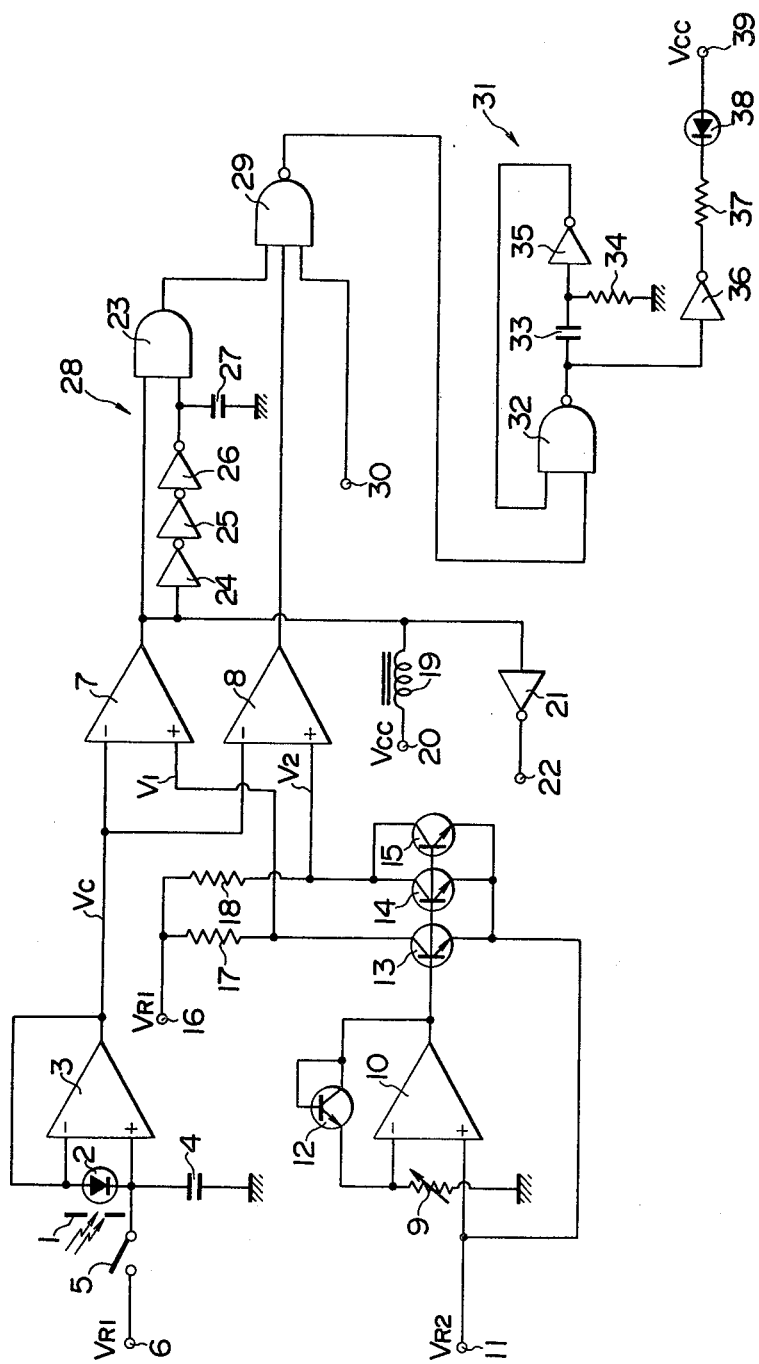
F I G. 2

OVEREXPOSURE INDICATOR FOR AN AUTOMATIC ELECTRONIC FLASH

BACKGROUND OF THE INVENTION

The invention relates to an overexposure indicator for an automatic electronic flash, and more particularly, to an apparatus for indicating the occurrence of an overexposure whenever the light emission from an automatic electronic flash exceeds a proper amount of exposure at which an emission terminate signal is produced.

When taking a picture with an automatic electronic flash, the light emission from an electronic flash is generally controllable over a limited extent, and the emission control of the electronic flash tends toward and overexposure as the distance to an object being photographed reduces or as the diaphragm value increases. By way of example, in an automatic electronic flash of series controlled type, if an emission terminate signal is produced simultaneously with an emission initiate signal, there results a definite or minimum light emission from the electronic flash rather than becoming a zero emission. This is attributable to the nature of a forced commutating circuit including a thyristor of an automatic emission termination circuit associated with the electronic flash. Recently, a TTL (through-the-lens) automatic electronic flash is in practical use which is controlled in accordance with an output from an automatic exposure control circuit of a photographic camera of TTL direct photometry type. This arrangement allows a variety of lightings or automatic exposure control with multiple electronic flashes, by electrically interconnecting the camera and the electronic flash or flashes by means of an electric cord. However, from the standpoint of the minimum light emission, a transmission delay through a signal transmission line between the camera and the emission control circuit of the electronic flash or the use of the multiple electronic flashes causes an increase in the minimum light emission. Specifically, in the multiple flash arrangement, the minimum emission is equal to $G_{NOL} \times \sqrt{N}$ where $G_{NOL}$ represents the minimum emission of each individual electronic flash and N the number of electronic flashes used. FIG. 1 illustrates a curve L indicating the amount of exposure Ev actually provided by flashlight. As will be seen, due to an increased value of the minimum emission during a photographing operation which utilizes an electronic flash, there results a significant deviation toward an overexposure from a level $L_O$, representing a proper exposure, as the distance to an object being photographed reduces. It will thus be seen from this Figure that a picture cannot be taken utilizing an electronic flash because of the overexposure for a range of distances P. It will be appreciated that if a facility is provided to allow a photographer to recognize the overexposure, he can then immediately correct the diaphragm or light condition or the distance to an object being photographed to repeat another photographing operation under the flashlight illumination from the electronic flash, thus effectively preventing a failure which might result from the overexposure.

An arrangement is proposed already (U.S. Pat. No. 4,122,465) in which an indication is given that the light emission from an automatic electronic flash represents an overexposure. This arrangement gives an indication of a proper or improper exposure depending on whether an output from a photometric circuit reaches a level where an emission terminate signal is produced, within a very brief period from the initiation of light emission from the electronic flash. However, the length of the "very brief period" from the initiation of emission depends on the emission interval of the electronic flash. By way of example, an electronic flash having a reduced value of guide number has an emission interval of about 2 ms while an electronic flash of an annular bulb form which is used for close-ups has an emission interval which is as long as two or three times the above mentioned value. Thus, the emission interval cannot be uniquely fixed. An overexposure is the result of a complex combination of various factors such as a response lag of an emission termination circuit, a time interval required for the electronic flash to terminate its emission, a residual emission after the termination of the emission which is inherent to an electronic flash of series control type and other factors. Hence, it is undesirable to determine if the exposure is proper or improper solely dependent on the timing of the emission terminate signal from the initiation of the light emission. Such determination would degrade the accuracy. Since the decision of the overexposure is not made on the basis of actual exposure of the image plane, a mere warning or indication of overexposure is insufficient to determine if the exposure is tolerable or intolerable.

SUMMARY OF THE INVENTION

In view of the foregoing, it is an object of the invention to provide an overexposure indicator for an automatic electronic flash in which a time factor signal of a given duration is produced in synchronism with an emission terminate signal applied to an electronic flash, and an output is also produced which is indicative of the fact that the light emission from the electronic flash has reached an arbitrary multiple of a proper amount of exposure at which the emission terminate signal is produced, thereby producing an indication of the overexposure whenever the output is produced during the presence of the time factor signal.

In accordance with the invention, an indication of the overexposure is given when the amount of exposure reaches an arbitrary multiple of a proper amount of exposure within a given time interval from the emission terminate signal applied to the electronic flash. Accordingly, a photographer is permitted to recognize the overexposure when he is taking a picture of an object located at a short distance, utilizing an automatic electronic flash. Consequently, he can immediately change the photographing conditions and repeat a photographing operation with the electronic flash. In this manner, a failure to take a picture due to the overexposure is avoided, by utilizing a simple circuit arrangement.

BRIEF DESCRIPTION OF THE DRAWINGS

FIG. 2 is a circuit diagram of an indicator according to an embodiment of the invention.

DESCRIPTION OF PREFERRED EMBODIMENT

Figure 1:
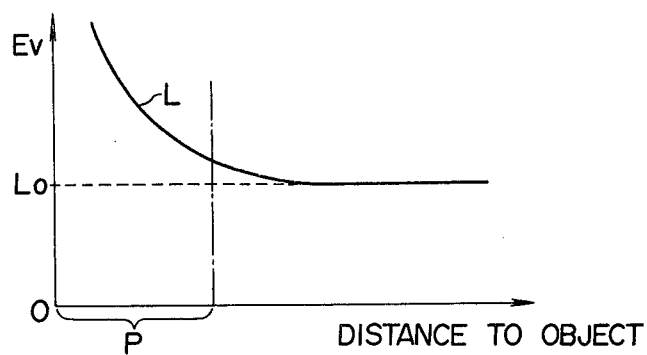
FIG. 1 graphically shows the relationship of the amount of exposure plotted against a distance to an object being photographed when taking a picture with an electronic flash.

Referring to FIG. 2, there is shown a circuit diagram of an indicator according to one embodiment of the invention. It is to be understood that the indicator is designed for use with a single lens reflex camera of TTL direct photometry type which cooperates with TTL automatic electronic flash. As is well known, a single lens reflex camera of TTL direct photometry type (hereafter simply referred to as "camera") is arranged such that light from an object being photographed passes through a diaphragm aperture 1 associated with the taking lens and is then reflected by the first blind surface of a focal plane shutter and thereafter by a film surface which becomes exposed as the first blind begins to run, before it impinges on a photoelectric transducer element 2 which is provided for purpose of photometry. The transducer element 2 has its anode connected to an inverting input terminal and its cathode to a non-inverting input terminal of an operational amplifier 3. The non-inverting input terminal of the amplifier 3 is also connected to the ground through an integrating capacitor 4 and also connected through a trigger switch 5, which is changed from its closed to its open condition in interlocked relationship with the initiation of running of the first blind of the shutter, to a terminal 6, to which a reference voltage $V_{R1}$ is applied. The inverting input terminal of the amplifier 3 is also connected to its output terminal. The output terminal of the amplifier 3 is further connected to the inverting input terminal of a pair of operational amplifiers 7, 8, which form comparators. In this manner, an integrated voltage Vc developed by the capacitor 4, which integrates a photocurrent passing through the transducer element 2, is applied to the inverting input terminal of the amplifiers 7, 8.

A variable resistor 9 which is provided to preset a film speed is connected between the inverting input terminal of an operational amplifier 10 and the ground, and the non-inverting input terminal of the amplifier 10 is connected to a terminal 11, to which another reference voltage $V_{R2}$ is applied. An NPN transistor 12 has its emitter connected to the inverting input terminal of the amplifier 10 and has its base and collector connected together and connected to the output terminal thereof so as to operate as a logarithmic compression diode. The output terminal of the amplifier 10 is connected to the base of NPN transistors 13, 14, 15 in common, which form a current mirror circuit of known form together with the transistor 12. The transistors 13 to 15 have their emitters connected in common and connected to the terminal 11. The collector of the transistor 13 is connected to the non-inverting input terminal of the amplifier 7 and is also connected through resistor 17 to a terminal 16, to which the reference voltage $V_{R1}$ is applied. The collectors of the transistors 14, 15 are connected in common and connected to the non-inverting input terminal of the amplifier 8, and also connected through resistor 18 to the terminal 16. In this manner, decision voltages $V_1$, $V_2$, which correspond to the film speed preset by the variable resistor 9, are applied to the non-inverting input terminal of the amplifiers 7, 8.

The output terminal of the amplifier 7 is connected to one end of a control electromagnet 19, which is operative to constrain the second blind of the shutter against running and which has its other end connected to a terminal 20, to which a supply voltage Vcc is applied. The output terminal of the amplifier 7 is also connected through an inverter 21 to a terminal 22, which delivers an emission terminate signal to an associated electronic flash. Additionally, the output terminal of the amplifier 7 is connected to one input of AND gate 23, and is also connected through series connected inverters 24, 25 and 26 to the other input of gate 23. The other input terminal of the gate 23 is connected to the ground through a capacitor 27. The elements 23, 24, 25, 26 and 27 form together a detection circuit 28 which responds to an output from the amplifier 7 by producing a time factor signal, to be used in the decision of the overexposure and having a given duration which is determined by the combination of the inverters 24 to 26 and capacitor 27, in synchronism with the output of the amplifier 7.

The output terminal of the gate 23 is connected to a first input terminal of NAND gate 29. The output terminal of the amplifier 8 is connected to a second input terminal of the gate 29, the third input terminal of which is connected to a terminal 30, to which a charging signal is applied from the electronic flash whenever a main capacitor within the electronic flash has been charged.

The output terminal of the gate 29 is connected to one input of NAND gate 32, which represents the input terminal of one-shot multivibrator 31. Specifically, the one-shot 31 comprises NAND gate 32, capacitor 33, resistor 34 and inverter 35. The output terminal of gate 32 is connected to one end of capacitor 33, the other end of which is connected to the ground through resistor 34 and also connected through inverter 35 to the other input terminal of the gate 32. The output terminal of the gate 32 represents the output terminal of the one-shot, and is connected through a series combination of an inverter 36 and a resistor 37 to the cathode of light emitting diode 38, the anode of which is connected to a terminal 39, to which the supply voltage Vcc is applied. The diode 38 serves as an indication of an overexposure.

Figure 3:
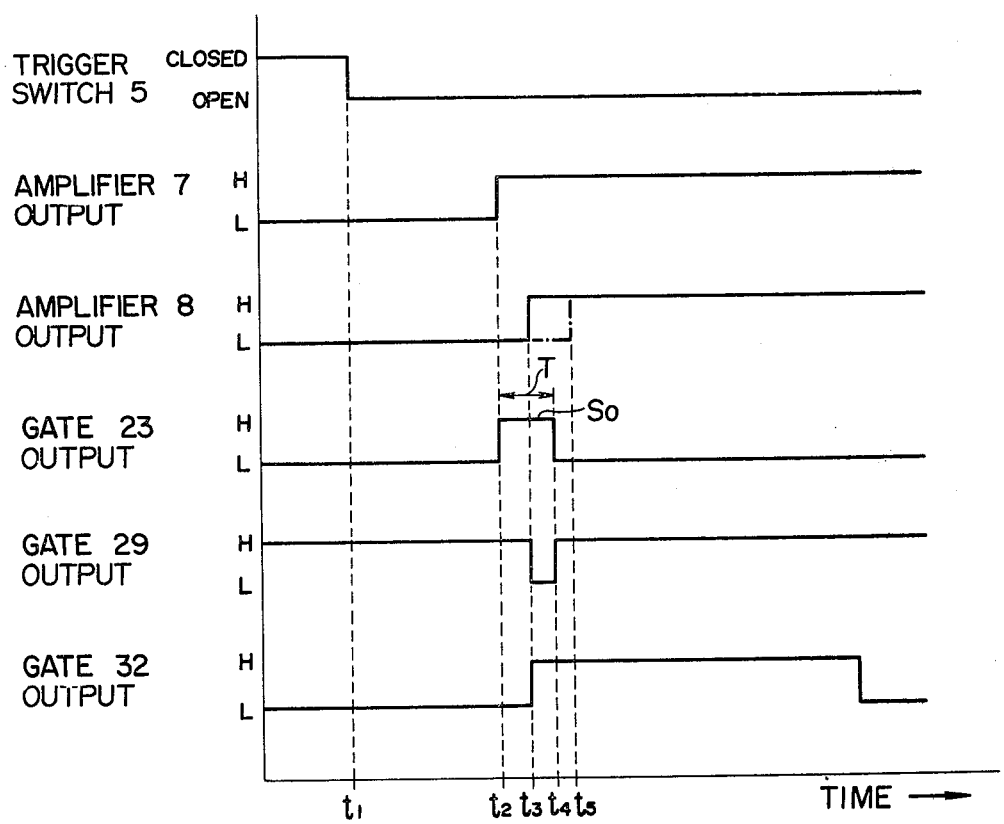
FIG. 3 is a series of timing charts illustrating the operation of the indicator shown in FIG. 2.

The operation of the indicator mentioned above will be described below with reference to the timing charts shown in FIG. 3. Initially, the TTL automatic electronic flash is connected to the camera including the indicator. When a power switch is turned on, the supply voltage Vcc is applied to the terminals 20, 39, the reference voltage $V_{R1}$ is applied to the terminals 6, 16, and the reference voltage $V_{R2}$ is applied to the terminal 11. Assuming that the variable resistor 9 has a resistance of $R_{ASA}$, there occurs a current flow of $V_{R2}/R_{ASA}$ through the transistor 12. Because of the characteristic of the current mirror circuit, there is a current flow of $V_{R2}/R_{ASA}$ through the collector of each of the transistors 13, 14, 15. Hence, assuming that each of the resistors 17, 18 has an equal resistance R, a decision voltage applied to the non-inverting input terminal of the amplifier 7 will be given by $V_1 = V_{R1} - R \cdot V_{R2}/R_{ASA}$. A decision voltage applied to the non-inverting input terminal of the amplifier 8 will be given by $V_2 = V_{R1} - 2R \cdot V_{R2}/R_{ASA}$. In other words, when the decision voltage $V_1$ applied to the amplifier 7 is established by the variable resistor 9 so as to correspond to the film speed in order to determine a proper amount of exposure, the decision voltage $V_2$ applied to the amplifier 8 is preset to a value which utilizes for its decision an amount of exposure that is 1 EV higher than the proper amount of exposure established for the amplifier 7.

Upon winding up the shutter blind, the trigger switch 5 is closed, whereby the capacitor 4 is charged to a level which is equal to the reference voltage $V_{R1}$. In response to a shutter release, a movable reflecting mirror moves upward and the first blind of the shutter begins running, thus opening the trigger switch 5 at time $t_1$. From time $t_1$ on, the capacitor 4 begins to be discharged by the photocurrent Is of the transducer element 2. Accordingly, an integrated voltage Vc applied to the inverting input terminal of the amplifiers 7, 8 is given by $V_c = V_{R1} - 1/C \int I_{st} dt$, thus gradually decreasing from the reference voltage $V_{R1}$. In this equation, C represents the capacitance of the capacitor 4.

During the running of the first blind of the shutter, there occurs no emission of light from the electronic flash and accordingly the brightness of an object being photographed is low. Hence, the integrated voltage Vc is higher than the decision voltage $V_1$, so that the output from the amplifier 7 is at its low level (hereafter referred to as "L" level), allowing the electromagnet 19 to be energized to constrain the second blind of the shutter from running. At this time, the terminal 22 assumes a high level (hereafter referred to as "H" level), and hence no emission terminate signal is produced. The gate 23 also produces an output of "L" level, which causes the detection circuit 28 to remain inoperative. The amplifier 8 also produces an output of "L" level. Accordingly, the gate 29 produces an output of "H" level, which cannot activate the one-shot 31, and hence the light emitting diode 38 remains deenergized.

Upon completion of running of the first blind of the shutter or when the shutter is fully open, synchro contacts, not shown, are closed to produce an emission initiate signal which is applied to the electronic flash, causing the latter to emit flashlight. As the object being photographed is illuminated by the flashlight from the electronic flash, its reflected light impinges upon the transducer element 2, and the integrated voltage Vc rapidly decreases in accordance with the photocurrent of the transducer element 2. When the integrated voltage Vc decreases to the level of the decision voltage $V_1$, the output of the amplifier 7 turn to its "H" level at time $t_2$, whereupon the electromagnet 19 is deenergized to allow the second blind of the shutter to begin running. Simultaneously, the terminal 22 assumes an "L" level to deliver an emission terminate signal to the electronic flash. As the output of the amplifier 7 turns to its "H" level, the gate 23 is enabled to produce an output of "H" level since the "L" level output of the amplifier 7 which is inverted to "H" level is applied to the other input terminal of the gate 23 through a delay circuit comprising the inverters 24 to 26 and capacitor 27. The output of the gate 23 remains at its "H" level for an interval T which is proportional to the product of the output impedance of the inverter 26 and the capacitance of the capacitor 27, and which may be chosen to be a brief interval equal to or less than 1 m sec, for example. The "H" level output of the gate 23 represents the time factor signal $S_O$.

For the reasons mentioned above, there is some delay before the electronic flash ceases to emit light in actuality, even if the emission terminate signal derived from the output of the amplifier 7 is applied to the electronic flash. Accordingly, the transducer element 2 continues to receive the flashlight from the electronic flash even after time $t_2$ when the emission terminate signal is produced, and consequently the integrated voltage Vc decreases below the decision voltage $V_1$ until it reaches the level of the decision voltage $V_2$ at time $t_3$, whereupon the output of the amplifier 8 turns to its "H" level. It will be seen that in case the light emission from the eletronic flash represents an overexposure, the time $t_3$ when the output of the amplifier 8 turns to its "H" level is earlier than time $t_4$ when the output of the gate 23 or the time factor signal $S_O$ turns to its "L" level, and appears within the time interval during which the time factor signal $S_O$ is produced.

If the output of the amplifier 8 turns to its "H" level during the time the time factor signal $S_O$ is present, and if the main capacitor within the electronic flash is charged to cause the terminal 30 to assume its "H" level, the output of the gate 29 is at its "L" level from time $t_3$ to $t_4$. When the "L" level signal from the gate 29 is applied to the one-shot 31, it produces an "H" level output for a given time interval dependent on the time constant of the capacitor 33 and resistor 34, from time $t_3$. This output is fed through the inverter 36 to the cathode of the diode 38, which then illuminates for the given time interval. The illumination of the diode 38 indicates the existence of an overexposure. Accordingly, a photographer may change the diaphragm or lighting or the distance to an object being photographed before trying another photographing operation.

If the output of the amplifier 8 turns to its "H" level at time $t_5$ which is later than time $t_4$, as indicated in phantom line in FIG. 3, the output of the gate 29 never turns to its "L" level, and hence the one-shot is not activated and the diode 38 is not illuminated to indicate the overexposure. Accordingly, a photographer can recognize that a picture has been taken with a proper amount of exposure while utilizing the electronic flash.

As discussed above, in accordance with the invention, a warning and an indication of the overexposure is given depending on whether a photometric output reaches a given level, defining an overexposure, within a given time interval after the emission terminate signal is produced. It is to be noted that the residual light emission due to a lag in the turn-off operation of the electronic flash as well as the minimum light emission inherent to the electronic flash of series controlled type, both of which represent the major causes of the overexposure, are both of consequence in a time period of nearly several hundred microseconds after the emission terminate signal is produced, which period can be uniquely defined without any significant variation as the time interval of the light emission of the electronic flash changes. Accordingly, a warning or an indication of the overexposure can be reliably given.

What is claimed is:

1. An overexposure indicator for an automatic electronic flash, comprising:
    means for producing and delivering an emission terminate signal to an electronic flash whenever an amount of exposure provided by light reflected from an object being photographed which is illuminated by flashlight from an electronic flash reaches a proper value corresponding to a preset film speed;
    means responsive to the emission terminate signal for producing a time factor signal of a given duration which is synchronized with the emission terminate signal;
    means for detecting an overexposure and for producing an output representing an overexposure whenever the amount of exposure provided by the light reflected from the object being photographed reaches an arbitrary multiple of the proper value;
    and means for indicating the occurrence of an overexposure in response to an output from the detecting means when the time factor signal is present.

2. An overexposure indicator according to claim 1 in which the means for producing the emission terminate signal comprises a comparator having its one input terminal receiving an output from an integrating circuit which is used for purpose of photometry and having its other input terminal applied with a decision voltage which is established in accordance with a film speed, and in which the means for detecting an overexposure comprises a comparator having its one input terminal receiving an output from the integrating circuit and having its other input terminal applied with a decision voltage which is an arbitrary multiple of the decision voltage.

3. An overexposure indicator according to claim 1 in which the means for producing a time factor signal comprises a delay circuit for inverting an output from the means for producing the emission terminate signal and for delaying it by a given time period, and a logic circuit for producing a logical product output of an output from the delay circuit and the output from the means for producing the emission terminate signal.

4. An overexposure indicator according to claim 3 in which the delay circuit comprises a plurality of inverters, and a capacitor connected with the inverters to define a given time constant which is a function of the output impedance of the inverters and the capacitance value of said capacitor.

5. An overexposure indicator according to claim 1 in which the means for indicating an overexposure comprises a logic circuit for producing an output which is the logical product of an output from the means for detecting an overexposure and the time factor signal, a circuit for producing a display signal for the given time interval in response to an output from the logic circuit, and a display element providing a visual display in response to the display signal.

6. An overexposure indicator for an automatic electronic flash, comprising:
means for providing an emission terminate signal for coupling to an electronic flash when the exposure provided by light reflected from an object illuminated by flashlight from the electronic flash reaches a first level corresponding to a preset film speed;
means responsive to the emission terminate signal for generating a time factor signal of a predetermined duration, said time factor signal being initiated in synchronism with the occurrence of the emission terminate signal;
means for producing an overexposure signal when the amount of light reflected from said object reaches a level which is a predetermined multiple of said first level; and
means for indicating an overexposure condition responsive to the occurrence of said overexposure signal during the presence of said time factor signal.

7. An overexposure indicator for an automatic electronic flash, comprising:
means for generating a first signal responsive to light reflected from an object being photographed, including light from said electronic flash;
means for integrating said first signal;
means for generating an emission terminate signal when said integrated signal reaches a first level corresponding to a preset film speed;
means responsive to said emission terminate signal for generating a time factor signal pulse having a predetermined pulse width;
means responsive to said integrated signal for generating an overexposure signal when said integrated signal reaches a second level which is greater than said first level;
means for producing an overexposure indication when said overexposure signal occurs during the time interval of said time factor signal pulse.

8. The overexposure indicator of claim 7 wherein said means for generating an overexposure indication comprises logic means responsive to the simultaneous presence of said time factor signal pulse and said overexposure signal for generating an output.

9. The overexposure indicator of claim 8, said means for generating an overexposure indication further comprising circuit means responsive to the output of said logic means for generating a signal of greater duration than said output; and
alarm means responsive to said circuit means for producing an alarm to advise the operator of the flash of the overexposure condition.

* * * * *

UNITED STATES PATENT AND TRADEMARK OFFICE
CERTIFICATE OF CORRECTION

PATENT NO. : 4,426,143

DATED : January 17, 1984

INVENTOR(S) : Kazunori Mizokami

It is certified that error appears in the above-identified patent and that said Letters Patent is hereby corrected as shown below:

Column 1:

Line 16, change "and" to --an--.

Column 1:

Line 58, change "light" to --lighting--.

Signed and Sealed this

Sixteenth Day of October 1984

[SEAL]

Attest:

GERALD J. MOSSINGHOFF

Attesting Officer

Commissioner of Patents and Trademarks